US 8,270,734 B2

(12) United States Patent
Romanovskiy

(10) Patent No.: US 8,270,734 B2
(45) Date of Patent: Sep. 18, 2012

(54) METHOD AND APPARATUS FOR IMAGE PROCESSING OF DATA INCLUDING TRANSPARENCY INFORMATION

(75) Inventor: Alexey Romanovskiy, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1242 days.

(21) Appl. No.: 11/781,503

(22) Filed: Jul. 23, 2007

(65) Prior Publication Data

US 2008/0112634 A1    May 15, 2008

(30) Foreign Application Priority Data

Nov. 13, 2006  (KR) .................. 10-2006-0111810

(51) Int. Cl.
    *G06K 9/00* (2006.01)
(52) U.S. Cl. ....................................... 382/232; 382/166
(58) Field of Classification Search ............... 382/166, 382/232
    See application file for complete search history.

(56) References Cited

U.S. PATENT DOCUMENTS

| 5,999,189 A * | 12/1999 | Kajiya et al. ............... 382/232 |
| 2003/0123725 A1 * | 7/2003 | Narusawa .................. 382/166 |
| 2006/0256380 A1 * | 11/2006 | Klassen et al. ............ 358/1.16 |

FOREIGN PATENT DOCUMENTS

| JP | 2001-144934 | 5/2001 |
| JP | 2003-87572 | 3/2003 |
| JP | 2003-116004 | 4/2003 |
| WO | WO 99/55075 | 10/1999 |

* cited by examiner

*Primary Examiner* — Hadi Akhavannik
(74) *Attorney, Agent, or Firm* — NSIP Law

(57) ABSTRACT

An image-processing method and apparatus are disclosed. The method includes compressing color information of an input image, generating additional data, which includes transparency information of the input image, and providing a compressed image, which includes the generated additional data and the compressed color information. The apparatus can include: a color-information-compressing unit, which compresses the color information of an input image; a transparency-processing unit that generates additional data, which includes transparency information of the input image; and an output unit that generates a compression image that includes the generated additional data and the compressed color information.

31 Claims, 9 Drawing Sheets

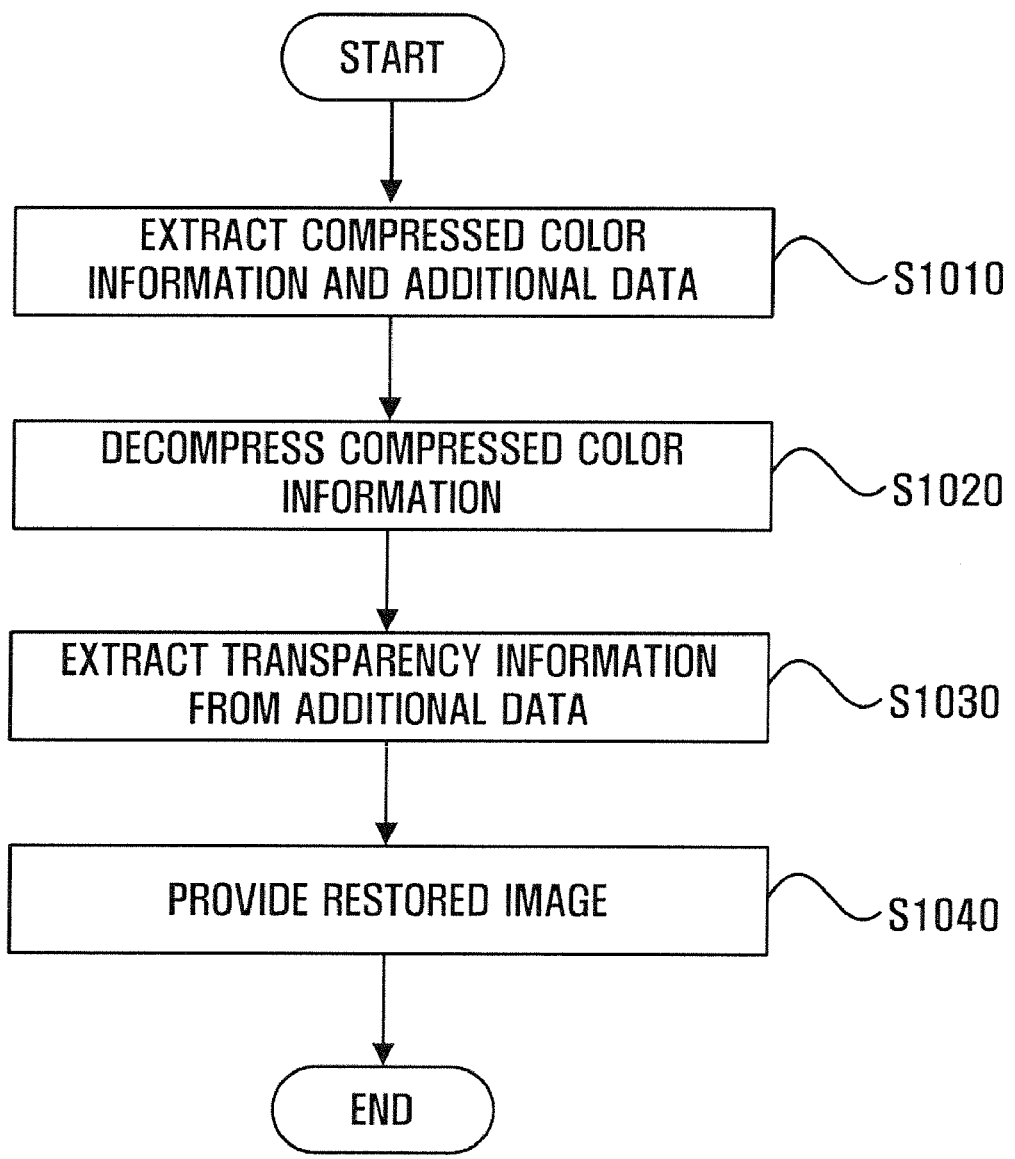

METHOD AND APPARATUS FOR IMAGE PROCESSING OF DATA INCLUDING TRANSPARENCY INFORMATION

CROSS-REFERENCE TO RELATED APPLICATIONS

This application claims the benefit of Korean Application No. 2006-111810, filed Nov. 13, 2006, in the Korean Intellectual Property Office, the disclosure of which is incorporated herein by reference.

BACKGROUND OF THE INVENTION

1. Field of the Invention

Aspects of the present invention relate to apparatuses and methods for image processing.

2. Description of the Related Art

Information relating to the transparency and color tones of images is useful for expressing the images. Especially in the case where more than two images are overlapped on one screen, transparency information is important for proper image expression. There are many known image coding/decoding formats that do not support the processing of image transparency. Examples of such formats include the Joint Photographic Experts Group format (JPEG), which is the most widely used image coding/decoding standard, and the Graphics Interchange Format (GIF).

Other standards and specifications have been suggested to supplement JPEG, but JPEG is still the most widely used image coding/decoding technology. Hence, there is a need for a technology based on the conventional JPEG format that can process image transparencies.

SUMMARY OF THE INVENTION

Aspects of the present invention provide a method and apparatus for image processing, which can process the transparency while being based on an image coding/decoding method that does not support the processing of the transparency of images.

The present invention will not be limited to the technical objects described above. Other aspects not described herein will be more definitely understood by those in the art from the following detailed description.

According to an exemplary embodiment of the present invention, there is provided an image-processing method, including compressing color information of an input image, generating additional data that includes transparency information of the input image, and providing a compressed image that includes the generated additional data and the compressed color information.

According to an exemplary embodiment of the present invention, there is provided an image-processing apparatus, including a color-information-compressing unit that compresses the color information of an input image, a transparency-processing unit that generates additional data that includes the transparency information of the input image, and an output unit that provides a compression image that includes the generated additional data and the compressed color information.

According to an exemplary embodiment of the present invention, there is provided an image-processing method, including decompressing compressed color information included in a compressed image, extracting transparency information from additional data included in the compressed image, and restoring the image using the decompressed color information and the extracted transparency information.

According to an exemplary embodiment of the present invention, there is provided an image-processing apparatus including a color-information-decompressing unit that decompresses compressed color information included in a compressed image, a transparency-processing unit that extracts transparency information from additional data included in the compressed image, and an output unit that restores the image using the decompressed color information and the extracted transparency information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

Figure 6:
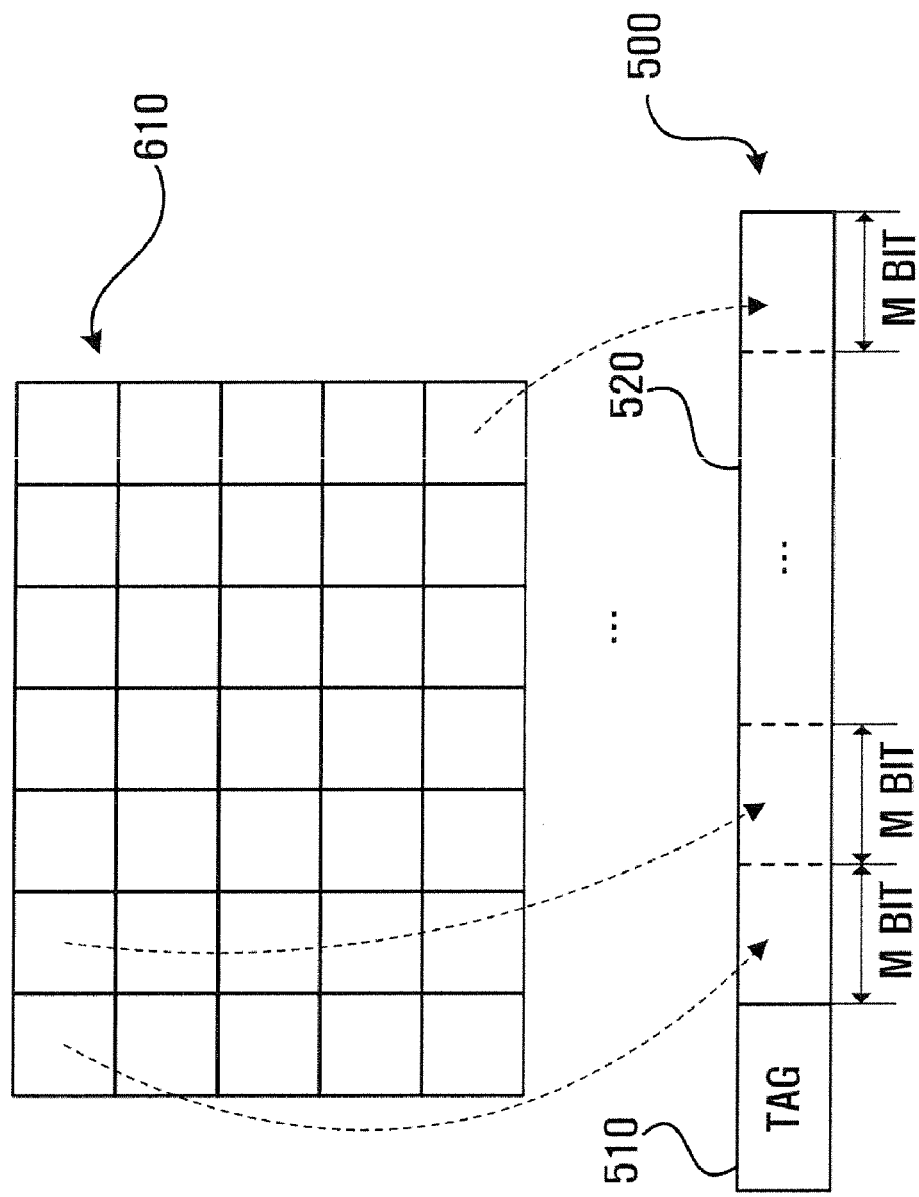
Figure 7:
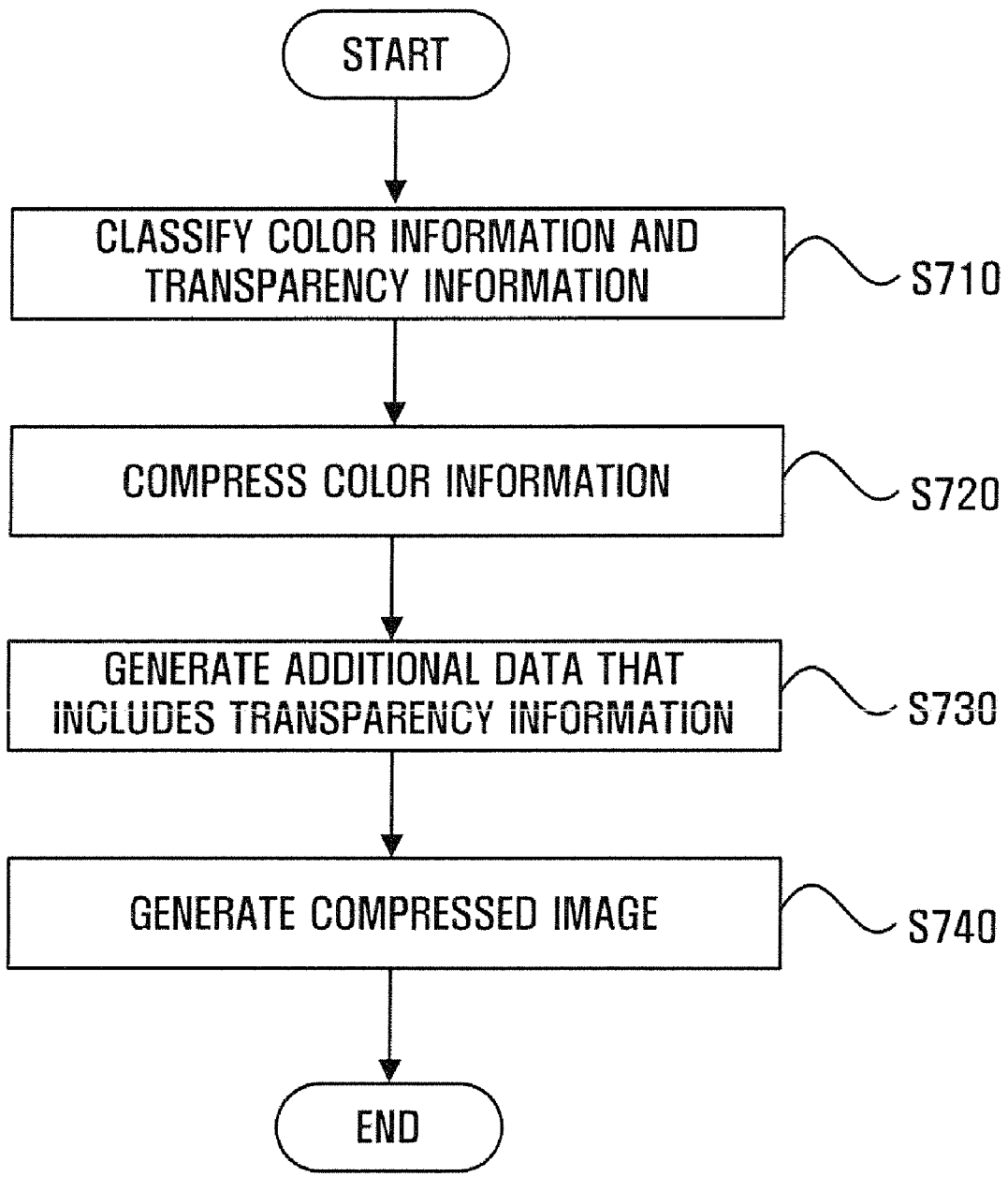
Figure 8:
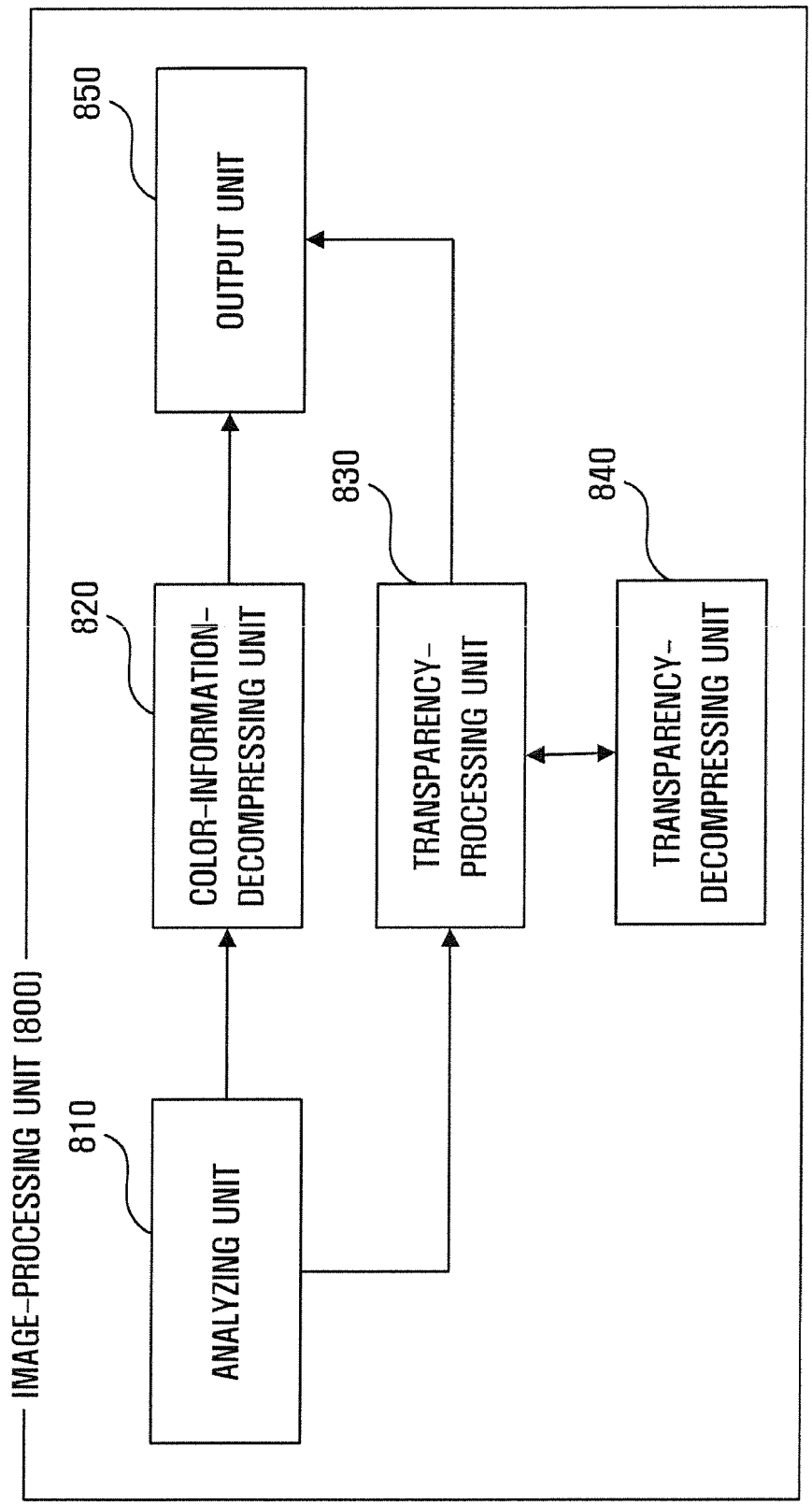
Figure 9:
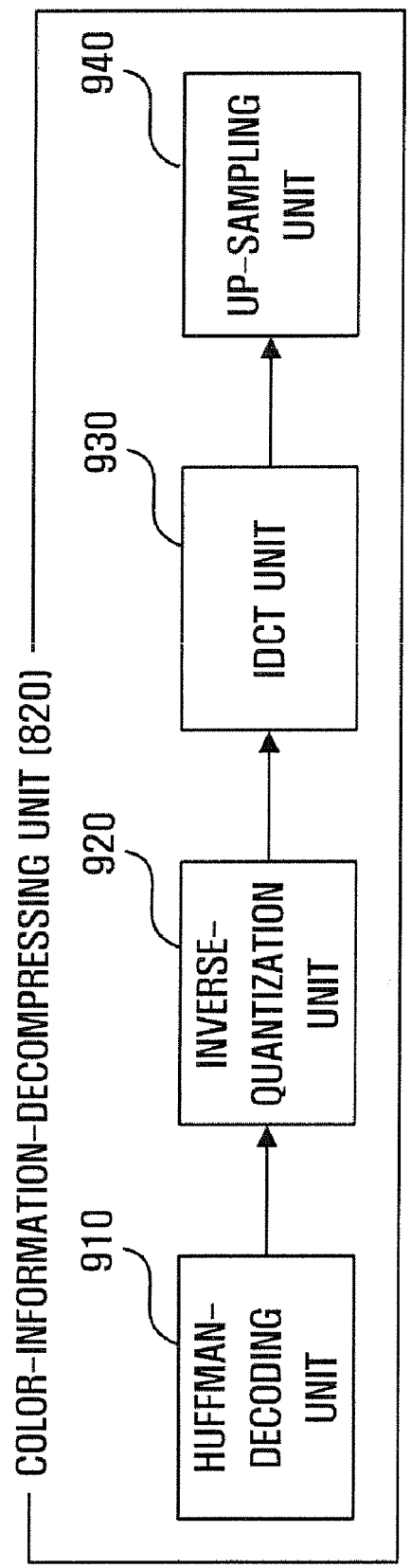

FIG, 5 illustrates additional data that includes transparency information according to an exemplary embodiment of the present invention;

FIG. 6 illustrates the constitution of additional data, according to an exemplary embodiment of the present invention;

FIG. 7 is a flowchart illustrating an image-processing procedure, according to an exemplary embodiment of the present invention;

FIG. 8 is a block diagram illustrating an image-processing apparatus, according to an exemplary embodiment of the present invention;

FIG. 9 is a block diagram illustrating an embodiment of the color-information-decompressing unit of FIG. 8; and FIG. 10 is a flowchart illustrating an image-processing procedure according to an embodiment of the present invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
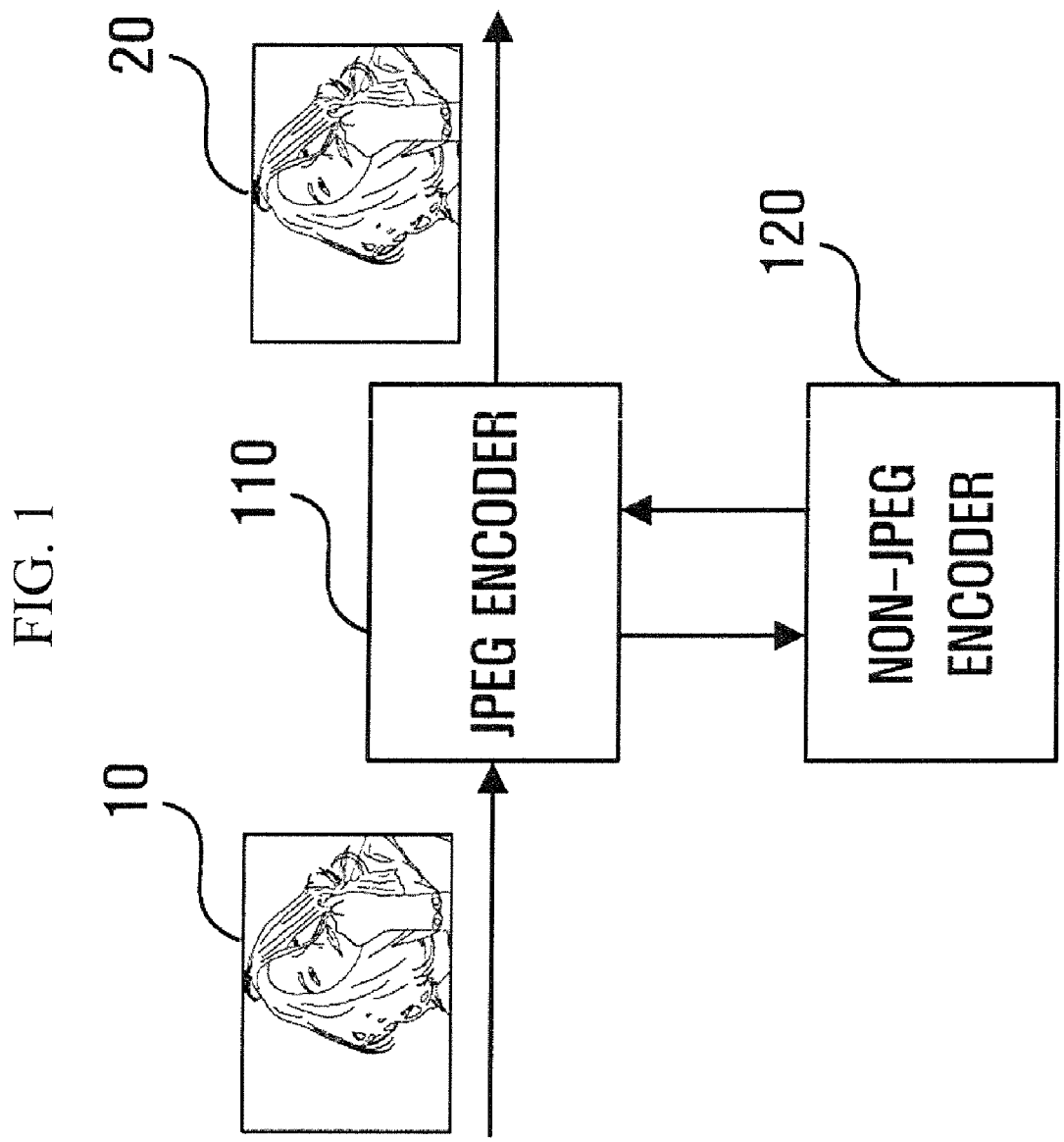
FIG. 1 illustrates an image-encoding method, according to an exemplary embodiment of the present invention.

FIG. 1 illustrates an image-encoding method, according to an exemplary embodiment of the present invention. A JPEG encoder 110 and a non-JPEG encoder can be used to encode an input image 10 and form a compressed image 20. The JPEG encoder 110 compresses color information of the input image. The compression can be a lossy compression. Further, the JPEG encoder 110 can handle transparency information, of the input image, as application data of the JPEG File Interchange Format (JFIF), which details the file format. A non-JPEG encoder 120 can be used to reduce the amount of data included in the compressed image 20. The non-JPEG encoder 120 can perform a lossless compression of transparency information, depending on image compression standards, such as, GIP and PNG. The JPEG encoder 110 and the non-JPEG encoder 120 can be integrated and can serve as one image-processing apparatus.

Figure 2:
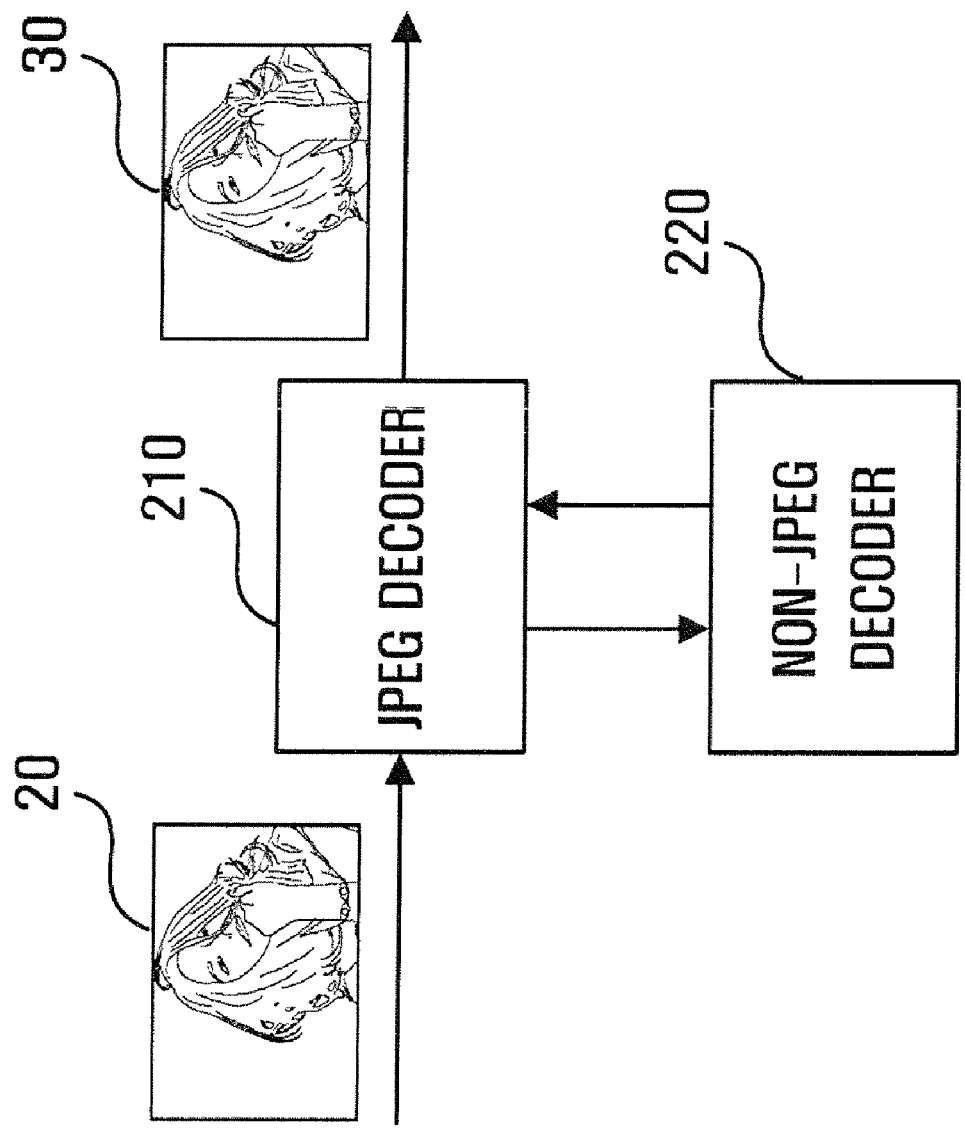
FIG. 2 illustrates an image-decoding method, according to an exemplary embodiment of the present invention.

FIG. 2 illustrates an image-decoding method, according to an exemplary embodiment of the present invention. A JPEG decoder 210 and a non-JPEG decoder 220 can be used, in order to decode a compressed image 20. The JPEG decoder 210 decompresses compressed color information of the compressed image 20. Here, the decompression method corresponds to the compression method, used by the JPEG encoder 110 of FIG. 1. The JPEG decoder 210 can extract application data included in the compressed image 20, acquire transparency information, acquire color information, and can provide an output image 30, using the transparency information and the color information. If the transparency information has been compressed, a non-JPEG decoder 220 can be used. The non-JPEG decoder 220 decompresses compressed transparency information. The decompression method used by the non-JPEG decoder 220 corresponds to the compression method used by the non-JPEG encoder 120, of FIG. 1. The JPEG decoder 210 and the non-JPEG decoder 220 can be integrated and can function as one image-processing apparatus.

The encoding and decoding method, described with reference to FIGS. 1 and 2, is merely exemplary, and does not limit the scope of the present invention. For example, in FIGS. 1 and 2, it has been described that an image is encoded based on the JPEG standard, but a non-JPEG standard can additionally be used in order to compress transparency information. However, any image-processing method, in which color information of an input image is compressed, based on an image-coding standard that performs a lossy compression, can be used. Any decompression method, corresponding to the lossy compression; and any image-coding standard that performs a lossless compression and a decompression corresponding to the lossless compression, to compress and decompress transparency information of the input image, should be understood to be included in the scope of the present teachings, regardless of the image-coding standard used.

Figure 3:
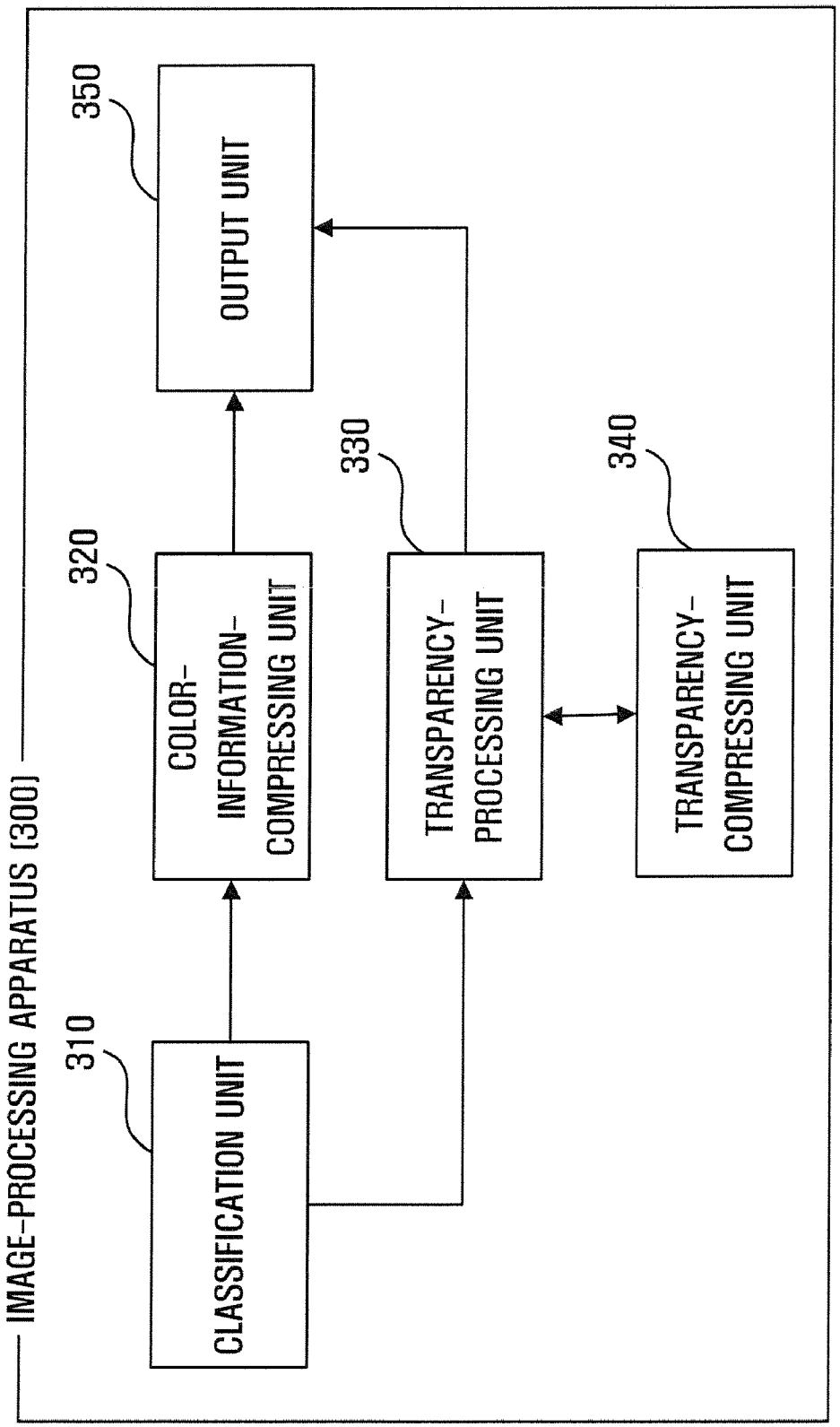
FIG. 3 is a block diagram illustrating an image-processing apparatus, according to an exemplary embodiment of the present invention.

An embodiment of the present invention will be described in more detail with reference to FIGS. 3 to 10. FIG. 3 is a block diagram illustrating an image-processing apparatus 300, according to an exemplary embodiment of the present invention. The image-processing apparatus 300 includes a classification unit 310, a color-information-compressing unit 320, a transparency-processing unit 330, a transparency-compressing unit 340, and an output unit 350. The illustrated image-processing apparatus 300 functions as an encoder that encodes the input image and can perform the functions of the method of FIG. 1.

The classification unit 310 classifies color information and transparency information of an input image. Each pixel of the input image can include color information and transparency information. Here, the color information can be defined as red (R), green (G), and blue (B) values, and the transparency information can be defined as an alpha ($\alpha$) value. The alpha ($\alpha$) value is a parameter that represents transparency. The alpha value can be determined in the same range as the range of R, G, and B values. For example, if the input image is the 8-bit image, R, G, and B values are determined in the range of 0 to 255, and the alpha value also can also be determined in the range of 0 to 255. The alpha value can be normalized to be between 0 and 1.

The color-information-compressing unit 320 compresses color information of the input image. A lossy compression can be used for the compression of the color information. The color-information-compressing unit 320 can perform the lossy compression according to the JPEG standard. The color-information-compressing unit 320 can use other image-compressing methods that do not support the lossless compression of the transparency information of the input image.

Figure 4:
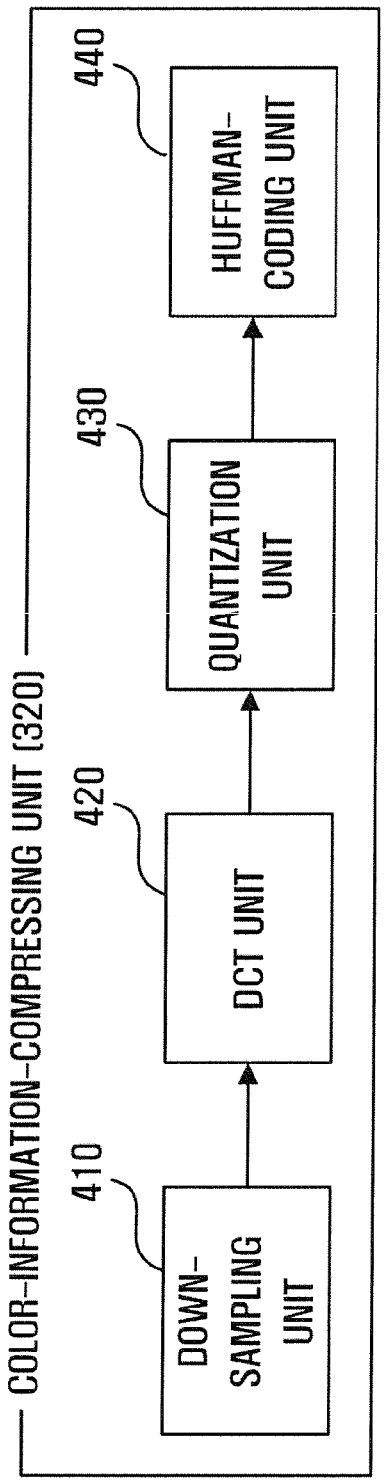
FIG. 4 is a block diagram illustrating the color-information-compressing unit of FIG. 3.

In the case where the color-information-compressing unit 320 follows the JPEG standard, the color-information-compressing unit 320 converts the RGB color space of the input image into a YCbCr color space, as illustrated in FIG. 4. The color-information-compressing unit 320 can include a down-sampling unit 410 that samples Y, Cb, and Cr elements at predetermined rates, a DCT unit 420 that performs a discrete cosine transformation (DCT) of the sampled data, a quantization unit 430 that removes a portion of the DCT-processed data, and a Huffman-coding unit 440 that performs Huffman coding of the quantized data.

Figure 5:
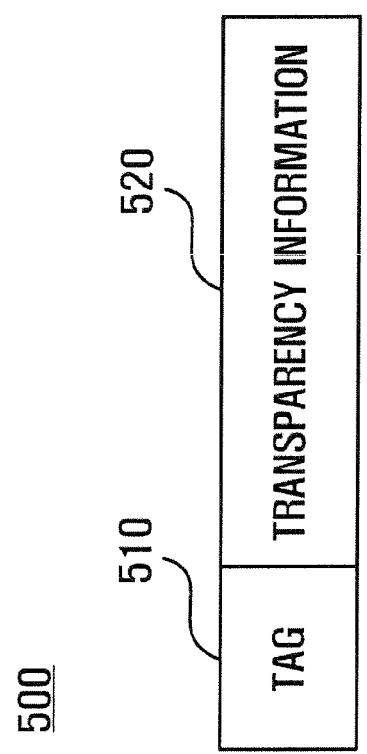

Referring to FIG. 1, the transparency-processing unit 330 generates additional data. The additional data can include the transparency information of an input image. The transparency information can be expressed as an alpha ($\alpha$) value. Additional data 500 that includes transparency information 520 can include a tag 510. The tag 510 can be used to identify the presence of transparency information in an input image, as illustrated in FIG. 5. If all pixels of the input image have the same transparency, the transparency information 520 can be set as a single alpha value. However, in the case where the transparency differs, for various pixels of the input image, the transparency information 520 can include an alpha value corresponding to the transparency of each pixel. For example, if the transparency, of each pixel of the input image, is individually defined, the transparency information 520, included in the additional data 500, can include an alpha value for each pixel of the input image 610, in a certain bit unit (bit unit M in FIG. 6).

If the image-processing apparatus 300 is based on the JPEG standard, the additional data 500 that includes the transparency information can be defined as application data used in the JPEG standard.

Referring to FIG. 1, the transparency-compressing unit 340 compresses transparency information. Here, the compression can be lossless compression. When lossy compression is used, errors can be generated in the transparency information, and the effect of the generated errors can be recognized by a user, when the image is restored.

Unlike color information, the transparency information is generally losslessly compressed. The transparency-compressing unit 340 can use an image-compressing method that is different from the color-information-compressing unit 320. For example, if the color-information-compressing unit 320 performs lossy compression of the color information, according to the JPEG standard, the transparency-compressing unit 340 can losslessly compress the transparency information, according to standards, such as, GIF or PNG. However, the present invention is not limited thereto, as other types of image-compressing methods can be used.

The output unit 350 provides a compressed image by constituting color information compressed by the color-information-compressing unit 320 and additional data provided from the transparency-processing unit 330, as one file. Other information can also be included in the compressed image. For example, in the case where the image-processing unit 300 is based on the JPEG standard, information such as Start Of Image (SOI), Define Quantization Tables (DQT), and Start Of Frame (SOF) can be included in the compressed image.

In FIG. 3, the image-processing unit 300 includes the transparency-compressing unit 340, but the present invention is not so limited. For example, it is possible that the image-processing unit 300 does not include the transparency-compressing unit 340. Here, the transparency-processing unit 330 can call an image encoder (not shown), outside the image-processing unit 300, for the compression of the transparency information. The called image encoder can perform the work performed by the transparency-compressing unit 340, as a substitute.

FIG. 7 is a flowchart illustrating an image-processing procedure, according to an exemplary embodiment of the present invention. The illustrated image-processing procedure is performed by the image-processing apparatus 300 that has been described with reference to FIG. 3.

The classification unit 310 classifies color information and transparency information of the input image, in operation S710. Operation S710 can be performed on each pixel of the input image, in order.

The color-information-compressing unit 320 compresses color information of the input image, in operation S720. The transparency-processing unit 330 generates additional data that includes transparency information, in operation S730.

As illustrated above, operation S720 is performed using lossey compression, according to the JPEG standard. Operation S720 can include color-space conversion, DCT, quantization, and Huffman coding.

In FIG. 7, it is illustrated that operation S730 is performed after operation S720. However, the order of the performance of operation S720 and operation S730 can be changed, or operation S720 and operation S730 can be performed at the same time, depending on the situation.

If the color information is compressed, and if additional data that includes transparency information is generated, the output unit 350 generates a compressed image that includes the compressed color information and the generated additional data, in operation S740. Further, other information can be included in the compressed image.

Further, a lossless compression process, of the transparency information, can be added, although such a process is omitted in FIG. 7. Ordinarily, the transparency information is compressed, so as to reduce the amount of information of the compressed image. However, in the case where the transparency information includes only a single alpha value, to be allocated to all pixels of the input image in the same manner, the transparency information does not need to be compressed. However, as illustrated in FIG. 6, if the transparency information includes the alpha values of each pixel of the input image, it is preferable to reduce the amount of transparency information. Therefore, in such a case it is preferable to perform a lossless compression process on the transparency information.

FIG. 8 is a block diagram illustrating an image-processing apparatus 800, according to an exemplary embodiment of the present invention. The image-processing apparatus 800 includes an analyzing unit 810, a color-information-decompressing unit 820, a transparency-processing unit 830, a transparency-decompressing unit 840, and an output unit 850. The illustrated image-processing unit 800 functions as a decoder that decodes an input image. For example, the image-processing unit 800 performs the work illustrated in FIG. 2.

The analyzing unit 810 extracts additional data that includes transparency information, and the extracted color information from the compressed image. The color-information-decompressing unit 820 decompresses the compressed color information. The decompression method, used by the color-information-decompressing unit 820, corresponds to the compression method used by the color-information-compressing unit 320, in the image-processing apparatus of FIG. 3. If the color-information-decompressing unit 820 is based on the JPEG standard, the color-information-decompressing unit 820 can include a Huffman-decoding unit 910, an inverse-quantization unit 920, an inverse-DCT unit 930, and an up-sampling unit 940.

The transparency-processing unit 830 extracts the transparency information from the additional data. The transparency-decompressing unit 840 decompresses the compressed transparency information. The decompression method, used by the transparency-decompressing unit 840, corresponds to the compression method used by the transparency-compressing unit 340. The transparency-decompressing unit 840 can operate in the case where the transparency information has been compressed.

The output unit 850 restores image using color information, provided by the color-information-decompressing unit 820, and transparency information provided by the transparency-processing unit 830. The output unit 850 can use the following equations.

$$R_{if} = R_{ib} \cdot \alpha_i + R_{ii} \cdot (1 - \alpha_i) \tag{1}$$

$$G_{if} = G_{ib} \cdot \alpha_i + G_{ii} \cdot (1 - \alpha_i) \tag{2}$$

$$B_{if} = B_{ib} \cdot \alpha_i + B_{ii} \cdot (1 - \alpha_i) \tag{3}$$

In equations 1 to 3, $R_{if}$, $G_{if}$ and $B_{if}$ are the final red (R), green (G), and blue (B) values of the $i^{th}$ pixel of the image, respectively; $R_{ib}$, $G_{ib}$ and $B_{ib}$ are R, G and B values of the $i^{th}$ pixel of the background image, respectively; and $R_{ii}$, $G_{ii}$ and $B_{ii}$ are R, G and B values provided from the color-information-decompressing unit 820, for the $i^{th}$ pixel. Further, in equations 1 to 3, $\alpha_i$ is a transparency parameter (e.g., an alpha value) allocated to the $i^{th}$ pixel of the image. Here, $\alpha_i$ is a normalized value between 0 and 1. If $\alpha_i$ is not a normalized value, the range of the $\alpha_i$ can be determined according to the number of bits that define the image. In such a case, equations 1 to 3 can also be expressed as:

$$R_{if} = R_{ib} \cdot \frac{\alpha_i}{\alpha_{max}} + R_{ii} \cdot \left(1 - \frac{\alpha_i}{\alpha_{max}}\right) \tag{4}$$

$$G_{if} = G_{ib} \cdot \frac{\alpha_i}{\alpha_{max}} + G_{ii} \cdot \left(1 - \frac{\alpha_i}{\alpha_{max}}\right) \tag{5}$$

$$B_{if} = B_{ib} \cdot \frac{\alpha_i}{\alpha_{max}} + B_{ii} \cdot \left(1 - \frac{\alpha_i}{\alpha_{max}}\right) \tag{6}$$

In equations 4 to 6, $\alpha_{max}$ is the maximum value that the non-normalized transparency parameter can have. For example, in the case of the 8-bit image, the transparency parameter $\alpha_i$ can be a value between 0 and 255, and in such a case, $\alpha_{max}$ is 255. The equations 1 to 6 are merely exemplary, and the present invention is not limited to such equations.

FIG. 10 is a flowchart illustrating an image-processing procedure, according to an exemplary embodiment of the present invention. The illustrated image-processing procedure can be performed on the image-processing apparatus 800 that has been described with reference to FIG. 8.

The analyzing unit 810 analyzes a compressed image, and extracts additional data that includes the compressed color information and transparency information, in operation S1010.

The color-information-decompressing unit 820 decompresses the compressed color information S1020, and the transparency-processing unit 830 extracts transparency information from the additional data, in operation S1030. A decompressing method, according to the JPEG standard, can be used in operation S1020, and in such a case, Huffman decoding, an inverse quantization, an IDCT, and an up-sampling can be performed. The order of operations S1020 and S1030 is not limited to the illustrated example. The order can be changed, or both operations can be performed at the same time.

When the compressed color information is decompressed, and the transparency information is provided, the output unit 850 provides the restored image using such information, in operation S1040. If the transparency information has been compressed, the decompressing procedure, of the compressed transparency information performed by the transparency-decompressing unit 840, can be added (the procedure has been omitted in FIG. 10).

As described above, when an image is processed, the image-processing apparatus 300 and the elements (units) that constitute the image-processing apparatus 300, can be implemented as modules. The term "module", as used herein, refers to, but is not limited to, a software or hardware component, such as, a Field Programmable Gate Array (FPGA), or an Application Specific Integrated Circuit (ASIC), which performs certain tasks. A module may advantageously be configured to reside in the addressable storage medium and configured to execute on one or more processors. For example, a module may include components, such as, software components, object-oriented software components, class components, task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

According to aspects of a method and apparatus for processing an image of the present invention, transparency information can be processed, even though the employed image-coding and decoding method does not support transparency processing of an image, which is advantageous.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image-processing method, comprising:
compressing color information of an input image;
generating additional data comprising transparency information of the input image; and
providing a compressed image that includes the generated additional data and the compressed color information,
wherein the compressing comprises performing lossy compression on the color information, converting an RGB color space of the input image into a YCbCr color space, and sampling the Y, Cb, and Cr elements of the YCbCr color space at predetermined rates, to produce sampled data, and
wherein the generating comprises performing lossless compression on the transparency information.

2. The method of claim 1, wherein the lossy compression follows a JPEG standard.

3. The method of claim 1, wherein the transparency information comprises a same transparency parameter allocated to each pixel of the input image.

4. The method of claim 1, wherein the transparency information comprises a transparency parameter for each pixel of the input image, and two or more of the transparency parameters are different.

5. The method of claim 1, further comprising sampling elements at predetermined rates.

6. The method of claim 1, wherein an image-coding method, on which the lossless compression is based, differs from an image-coding method used to compress the color information.

7. The method of claim 1, wherein the additional data follows a JPEG standard.

8. An image-processing apparatus comprising:
a color-information-compressing unit that compresses color information of an input image;
a transparency-processing unit that generates additional data comprising transparency information of the input image; and
an output unit that generates a compression image comprising the generated additional data and the compressed color information,
wherein the color-information-compressing unit performs lossy compression on the color information and comprises down-sampling unit, the down-sampling unit converting an RGB color space of the input image into a YCbCr color space, and sampling the Y, Cb, and Cr elements of the YCbCr color space at predetermined rates, to produce sampled data, and
wherein the transparency information is losslessly compressed.

9. The apparatus of claim 8, wherein the lossy compression follows a JPEG standard.

10. The apparatus of claim 8, wherein the transparency information comprises a same transparency parameter that is allocated to each pixel of the input image.

11. The apparatus of claim 8, wherein the transparency information comprises a transparency parameter for each pixel of the input image, and two or more of the transparency parameters are different.

12. The apparatus of claim 8, wherein an image-coding method, on which the lossless compression is based, differs from an image-coding method, on which the color-information-compressing unit is based.

13. The apparatus of claim 8, further comprising: a transparency-compressing unit that losslessly compresses the transparency information.

14. The apparatus of claim 8, wherein the additional data follows a JPEG standard.

15. An image-processing method comprising:
decompressing compressed color information included in a compressed image;
extracting transparency information from additional data included in the compressed image;
restoring the compressed image using the decompressed color information and the extracted transparency information; and
decompressing the extracted transparency information,
wherein the extracted transparency information is losslessly compressed prior to the decompressing, and
wherein the decompressing of the compressed color information comprises using a decompression method corresponding to a lossy compression method, converts a YCbCr color space into an RGB color space, and samples the Y, Cb, and Cr elements of the YCbCr color space at predetermined rates, to produce unsampled data.

16. The method of claim 15, wherein the lossy compression follows a JPEG standard.

17. The method of claim 15, wherein the transparency information comprises a same transparency parameter allocated each pixel of the input image in the same manner.

18. The method of claim 15, wherein the transparency information comprises a transparency parameter for each pixel that constitutes the input image, wherein the two or more of the transparency parameters are different.

19. The method of claim 15, wherein an image-decoding method, on which the lossless compression is based, differs from an image-decoding method used to decompress the color information.

20. The method of claim 15, wherein the additional data follows a JPEG standard.

21. An image-processing apparatus comprising:
- a color-information-decompressing unit that decompresses compressed color information included in a compressed image;
- a transparency-processing unit that extracts transparency information from additional data included in the compressed image;
- an output unit that restores the compressed image using the decompressed color information and the extracted transparency information; and
- a transparency-decompressing unit that decompresses the transparency information,
    - wherein the transparency information is losslessly compressed prior to the decompression, and
    - wherein the color-information-decompressing unit decompresses the compressed color information using a decompressing method corresponding to a lossy compression method and up-sampling unit converting a YCbCr color space into an RGB color space, and sampling the Y, Cb, and Cr elements of the YCbCr color space at predetermined rates, to produce unsampled data.

22. The apparatus of claim 21, wherein the lossy compression follows the JPEG standard.

23. The apparatus of claim 21, wherein the transparency information comprises a same transparency parameter allocated to each pixel of the input image.

24. The apparatus of claim 21, wherein the transparency information comprises a transparency parameter for each pixel of the input image, and two or more of the transparency parameters are different.

25. The apparatus of claim 21, wherein an image-decoding method, on which the transparency-decompressing unit is based, differs from an image-decoding method, on which the color-information-decompressing unit is based.

26. The apparatus of claim 21, wherein the additional data follows a JPEG standard.

27. The method of claim 1, wherein the compressing further comprises performing a discrete cosine transformation (DCT) of the sampled data, to produce DCT-processed data.

28. The method of claim 27, wherein the compressing further comprises removing a portion of the DCT-processed data, to produce quantized data.

29. The method of claim 27, wherein the compressing further comprises Huffman coding the quantized data.

30. The apparatus of claim 8, wherein the color-information-compressing unit comprises at least one of: a discrete cosine transformation (DCT) unit; a quantization unit; and a Huffman coding unit.

31. The apparatus of claim 21, wherein the color-information-decompressing unit comprises at least one of: a Huffman-decoding unit; an inverse-quantization unit; and an inverse- discrete cosine transformation (DCT) unit.

* * * * *